US012636138B2

(12) United States Patent
Alsalman et al.

(10) Patent No.: US 12,636,138 B2
(45) Date of Patent: May 26, 2026

(54) DENTAL IMPLANT-RETAINED DEVICE AND METHODS OF FABRICATING THEREOF

(71) Applicant: Imam Abdulrahman Bin Faisal University, Dammam (SA)

(72) Inventors: Abdulmohsen Alsalman, Dammam (SA); Ahmad Maniallah Al-Thobity, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 335 days.

(21) Appl. No.: 18/494,989

(22) Filed: Oct. 26, 2023

(65) Prior Publication Data

US 2025/0134639 A1     May 1, 2025

(51) Int. Cl.
*A61C 19/05* (2006.01)
*A61C 8/00* (2006.01)
*A61C 13/225* (2006.01)

(52) U.S. Cl.
CPC .......... *A61C 19/052* (2013.01); *A61C 8/0001* (2013.01); *A61C 13/225* (2013.01)

(58) Field of Classification Search
CPC ....... A61C 19/052; A61C 19/05; A61C 19/04; A61C 8/0001; A61C 8/00; A61C 13/225; A61C 13/00
USPC ........................................................ 433/167
See application file for complete search history.

(56) References Cited

U.S. PATENT DOCUMENTS

| | | | | |
|---|---|---|---|---|
| 4,655,712 A * | 4/1987 | Croll ...................... | A61C 19/00 | |
| | | | 359/885 | |
| 5,597,303 A | 1/1997 | Simmons | | |
| 2005/0112523 A1 | 5/2005 | Massad | | |
| 2007/0190492 A1 | 8/2007 | Schmitt | | |
| 2008/0038695 A1 | 2/2008 | Carlson | | |

FOREIGN PATENT DOCUMENTS

| | | |
|---|---|---|
| CN | 213430691 U | 6/2021 |
| RU | 2 741 862 C1 | 1/2021 |

OTHER PUBLICATIONS

Fujiwara et al., Tooth Shape Impression Recording Member and Method of Using It, WO 0016714 A1 (Year: 2000).*

(Continued)

*Primary Examiner* — Eric J Rosen
*Assistant Examiner* — Mirayda A Aponte
(74) *Attorney, Agent, or Firm* — Oblon, McClelland, Maier & Neustadt, L.L.P.

(57) ABSTRACT

A dental implant-retained record base device and methods of fabricating thereof are provided, and a method for obtaining an interocclusal record. The method involves inserting an impression post into a dental implant in a partially-dentate patient and capturing a dental impression to obtain a dental cast inclusive of the impression post. A light-curable resin is molded into a cubic shape and subsequently attached to the dental cast at position of the impression post. Upon exposure to visible light, the resin is cured to form a record base device, which is then adjusted to facilitate the positioning of interocclusal record material. The dental implant-retained device constructed from the light-cured resin is configured for attachment to the dental implant for obtaining the interocclusal record for the patient.

10 Claims, 5 Drawing Sheets

300

400

(56) References Cited

OTHER PUBLICATIONS

Susan S. Nimmo, et al., "Stabilized Record Base for Implant Treatment", Journal of Prosthodontics, vol. 19, Issue 7, Oct. 2010, pp. 586-588.

Kitichai Rungcharassaeng, et al., "Fabricating a stable record base for completely edentulous patients treated with osseointegrated implants using healing abutments", The Journal of Prosthetic Dentistry, vol. 81, Issue 2, Feb. 1999, pp. 224-227 (Abstract only).

Kostas Stamoulis, "Intraoral Acrylic Resin Coping Fabrication for Making Interocclusal Records", Journal of Prosthodontics, vol. 18, Issue 2, Feb. 2009, pp. 184-187.

* cited by examiner

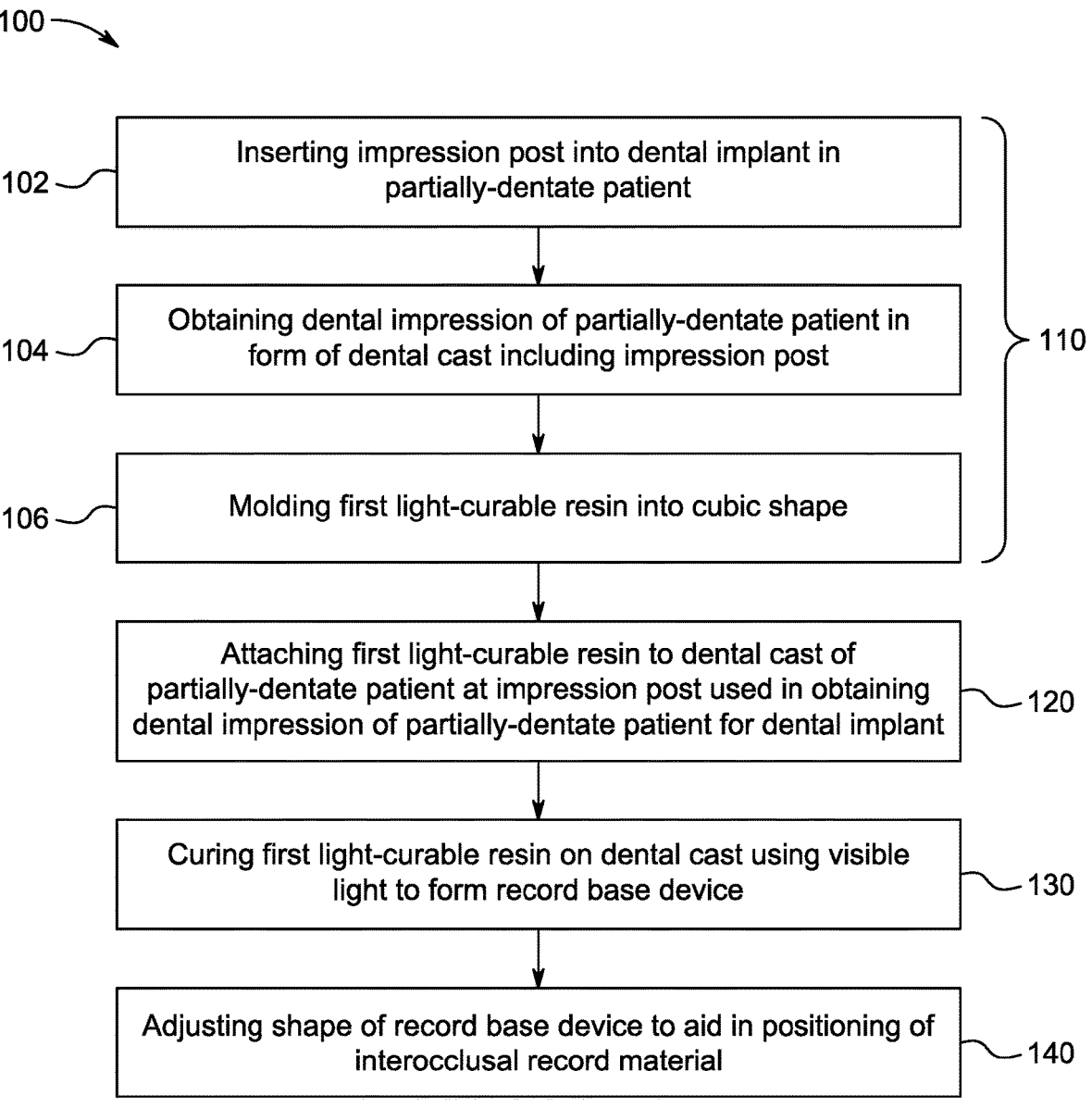

100

102 — Inserting impression post into dental implant in partially-dentate patient 104 — Obtaining dental impression of partially-dentate patient in form of dental cast including impression post 106 — Molding first light-curable resin into cubic shape

110

Attaching first light-curable resin to dental cast of partially-dentate patient at impression post used in obtaining dental impression of partially-dentate patient for dental implant — 120

Curing first light-curable resin on dental cast using visible light to form record base device — 130

Adjusting shape of record base device to aid in positioning of interocclusal record material — 140

DENTAL IMPLANT-RETAINED DEVICE AND METHODS OF FABRICATING THEREOF

BACKGROUND

Technical Field

The present invention relates to the field of dental prosthetics, specifically to a method and device for fabricating a dental implant-retained record base to obtain an accurate interocclusal record, especially for partially-dentate patients.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Dental prosthetics have evolved over time, catering to the diverse needs of patients. Accurate registration of interocclusal relationships, which captures the relationship between the upper and lower teeth, is an important component for this domain. This interocclusal relationships registration is especially critical when an implant-supported prosthesis is being designed. Unlike traditional tooth replacements, modern dental implants are designed to mimic natural teeth both in form and function. Given their direct integration with the jawbone and their non-reliance on neighboring teeth, the precision in capturing the interocclusal relationship becomes even more important to ensure a proper fit, optimal functionality, and patient comfort during the procedure.

Despite the progress in dental prosthetics, a challenge that remains in the domain of dental prosthetics is ensuring the rigidity, accuracy, and stability of the interocclusal record base. Traditional methods often employ materials that are susceptible to dimensional instability. Implant-supported prosthetics, while offering numerous advantages, do not have some of the forgiving characteristics of soft tissue supported prosthesis in regards of cushioning effect on some degree of the occlusal surfaces prematurity. Any misalignment or imprecision can result in undue stress on the implant, leading to potential complications, discomfort, and even implant failure.

To address these challenges, some techniques have been devised over the years aimed at registering interocclusal relationships, particularly for edentulous and partially dentate implant patients. These methods, while diverse, often revolve around the use of specific materials and tools. A common component in many of these techniques is the wax occlusal rim. This wax rim aids in capturing the bite relationship and provides a reference for the final prosthesis. Moreover, many methods involve additional implant components or parts that are integrated temporarily during the impression-taking process to ensure accuracy. However, the added expenses of the implant parts might be a disadvantage of some of these technique in addition to the inclusion of the wax occlusal rim which might reduce the accuracy of the interocclusal records.

Some advanced techniques have also been proposed to address the aforementioned challenges. For instance, US Patent Reference No. 20050112523A1 discloses a method of custom molding occlusal surfaces of dentures using special teeth for the lower posterior teeth on the mandibular plate of dentures and a central bearing device. Each special tooth has a receptacle that initially holds an insert for positioning and later contains moldable resin. This resin is molded by movements of the opposing teeth, with the central bearing device ensuring appropriate teeth spacing. The resin is then cured and the dentures are fit to the patient. This reference does not mention the use of a light-curable resin molded into a cubic shape, an impression post integrated with a dental implant, or the specific techniques for capturing interocclusal relationships, focusing instead on molding occlusal surfaces using special teeth.

US Patent Reference No. 20080038695A1 discloses a treatment prosthesis designed for efficient fabrication without the use of bite rims or interocclusal records. This prosthesis aids in the training of patient tissues and muscular structures before the actual denture fitting. It is designed mathematically and uses reference planes to minimize adjustments when placed in a patient's mouth. The prosthesis includes anterior teeth for realism and occlusion rims on the posterior portions for muscular development without interference from typical molar cusp structures. This reference does not mention the use of a light-curable resin, the integration of an impression post with a dental implant, or the specific techniques for capturing interocclusal relationships, focusing instead on the training of tissues and muscular structures.

US Patent Reference No. 20070190492A1 discloses a method and system for creating a dental prosthetic by arranging virtual tooth images on a virtual denture set and then positioning actual prosthetic teeth corresponding to the virtual images. The method involves Boolean operations to remove portions of the virtual tooth images and then machining the actual prosthetic teeth based on these operations. This reference does not mention the use of a light-curable resin molded into a cubic shape, an impression post integrated with a dental implant, or the specific techniques for capturing interocclusal relationships, focusing instead on the use of virtual images and Boolean operations for dental prosthetic fabrication.

Each of the aforementioned references suffers from one or more drawbacks hindering their adoption. Given the persistent challenges and limitations of conventional methods, there is a need for a more refined approach. Accordingly, it is one object of the present disclosure to provide a solution that not only ensure the rigidity, accuracy, and stability of the interocclusal record base but also be cost-effective and straightforward.

SUMMARY

In an exemplary embodiment, a method of fabricating a dental implant-retained record base device for obtaining an interocclusal record is provided. The method includes first inserting an impression post into a dental implant in a partially-dentate patient. The method further includes obtaining a dental impression of the partially-dentate patient in the form of a dental cast including the impression post. Then, the method further includes molding a first light-curable resin into a cubic shape. The method further includes attaching the first light-curable resin to the dental cast of the partially-dentate patient at the impression post used in obtaining the dental impression of the partially-dentate patient for the dental implant. The method further includes curing the first light-curable resin on the dental cast using a visible light to form a record base device. The method further includes adjusting a shape of the record base device to aid in positioning of an interocclusal record material.

In some embodiments, the method further includes attaching the record base device to the dental implant of the patient using a fastener.

In some embodiments, the method further includes covering the impression post with a coating of a second curable resin. Herein the impression post includes a cylindrical exterior extension having a smooth outer surface. The method also includes shaping the second curable resin on the impression post to form a shaped layer having a thickness no greater than 0.5 times the diameter of the impression post. Herein, the shaped layer includes evenly spaced circular circumferential protrusions. Then, the method further includes curing the shaped layer.

In some embodiments, adjusting the shape of the record base device includes forming an upwardly inclining top surface.

In some embodiments, the upwardly inclining top surface includes a first flat portion representing a majority of the top surface of the record base device and a second inclined portion.

In some embodiments, the impression post includes a cylindrical exterior extension and a plurality of evenly space holes passing through the long axis of the extension, the axis of each hole perpendicular to the axis of the extension, wherein the axis of each hole is shifted by 10-30 degrees radially from the axis of any neighboring hole.

In another exemplary embodiment, a method of fabricating a dental implant-retained record base device for obtaining an interocclusal record is provided. The method includes attaching a light-curable resin to a dental cast of a partially-dentate patient using an impression post that is used in obtaining a dental impression of the patient for a dental implant. The method further includes curing the light-curable resin on the dental cast using a visible light to form a record base device. The method further includes adjusting a shape of the record base device to aid in positioning of an interocclusal record material. The method further includes obtaining an interocclusal record of the patient using the record base device and the interocclusal record material.

In some embodiments, obtaining the interocclusal record of the patient includes attaching the record base device to the dental implant of the patient using a fastener; and positioning the interocclusal record material using the record base device.

In some embodiments, attaching the light-curable resin to the dental cast includes molding the light-curable resin into a cubic shape.

In some embodiments, adjusting the shape of the record base device includes adjusting a dimension of the record base device.

In some embodiments, the dimension includes at least one of a length, height, or width of the record base device In some embodiments, adjusting the shape of the record base device includes removing a portion of the light-curable resin from a surface of the record base device to aid in the positioning of the interocclusal record material.

In yet another exemplary embodiment, a dental implant-retained device for obtaining an interocclusal record is provided. The dental implant-retained device includes a record base device. The record base device is made of a light-cured resin. Herein, the light-cured resin is cured by attaching the light-cured resin to a dental cast of a partially-dentate patient using an impression post that is used in obtaining a dental impression of the patient for a dental implant. The record base device is configured to attach to the dental implant of the patient for obtaining the interocclusal record of the patient.

In some embodiments, the light-cured resin is molded to a first shape prior to curing the light-cured resin.

In some embodiments, the first shape is a cubic shape.

In some embodiments, the record base device is adjusted to fit in a mouth of the dental patient.

In some embodiments, the record base device is adjusted by adjusting a shape, a height, a length, or a width of the record base device.

In some embodiments, the record base device is configured to receive an interocclusal record material for obtaining the interocclusal record.

In some embodiments, the record base device is adjusted by removing a portion of the light-cured resin from a surface of the record base device to aid in the positioning of the interocclusal record material.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a flowchart listing steps involved in a method of fabricating a dental implant-retained record base device for obtaining an interocclusal record, according to a first embodiment;

DETAILED DESCRIPTION

Figure 2:
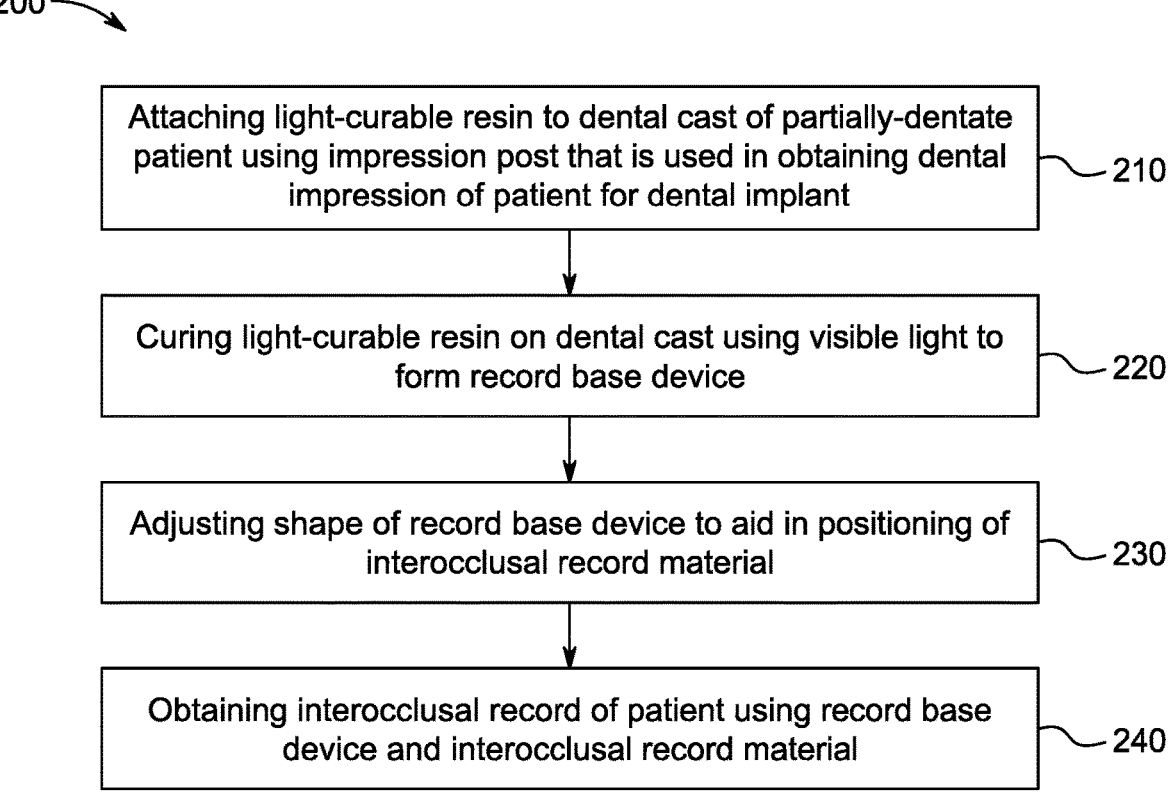
FIG. 2 is a flowchart listing steps involved in a method of fabricating a dental implant-retained record base device for obtaining an interocclusal record, according to a second embodiment.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a dental implant-retained record base device and methods of fabricating such dental implant-retained record base device to obtain a precise interocclusal record. The methods, generally, involve utilizing an impression post integrated with a dental implant in a partially-dentate patient, capturing a dental impression, and employing a light-curable resin to form the record base device. The resultant record base device is stable, accurate, and can be easily attached to the dental implant, providing a reliable foundation for recording the interocclusal relationship. The present disclosure provides a holistic approach to the challenges traditionally faced in the domain of dental prosthodontics, particularly for obtaining precise interocclusal records for partially dentate implant patients. The methods and devices described herein offer precise and tailored solutions to cater to each patient's unique oral anatomy.

Referring to FIG. 1, illustrated is a flowchart listing steps involved in a method (as represented by reference numeral 100) of fabricating a dental implant-retained record base device for obtaining an interocclusal record, according to a first embodiment of the present disclosure. The method 100 is configured to fabricate the dental implant-retained record base device which aids in capturing interocclusal records with an improved accuracy. The method 100 provides a structured sequence that ensures a systematic approach, optimizing each step for precision and efficiency. While the specifics of each step are expansive and detailed, the overall objective is to provide a process that integrates various components and techniques.

First, the method 100 involves preparatory steps which have been represented collectively as process 110. This involves, a step 102, first inserting an impression post (as shown on a dental cast 300, illustrated in FIG. 3 and represented by reference numeral 302) into a dental implant in a partially-dentate patient. That is, the process 110 starts with the integration of the impression post 302 into the dental implant within an oral cavity of the partially-dentate patient. Herein, the impression post 302 serves as the primary interaction point between the dental implant and the subsequent processes, acting as a foundational marker signifying exact position and orientation of the dental implant. Specifically, the impression post 302 acts as a bridge between the patient's actual dental implant and the external dental cast, ensuring that the latter is an accurate reflection of the former. Thereby, the impression post 302 ensures that the subsequent dental impression captures precise location and alignment of the dental implant.

Figure 3:
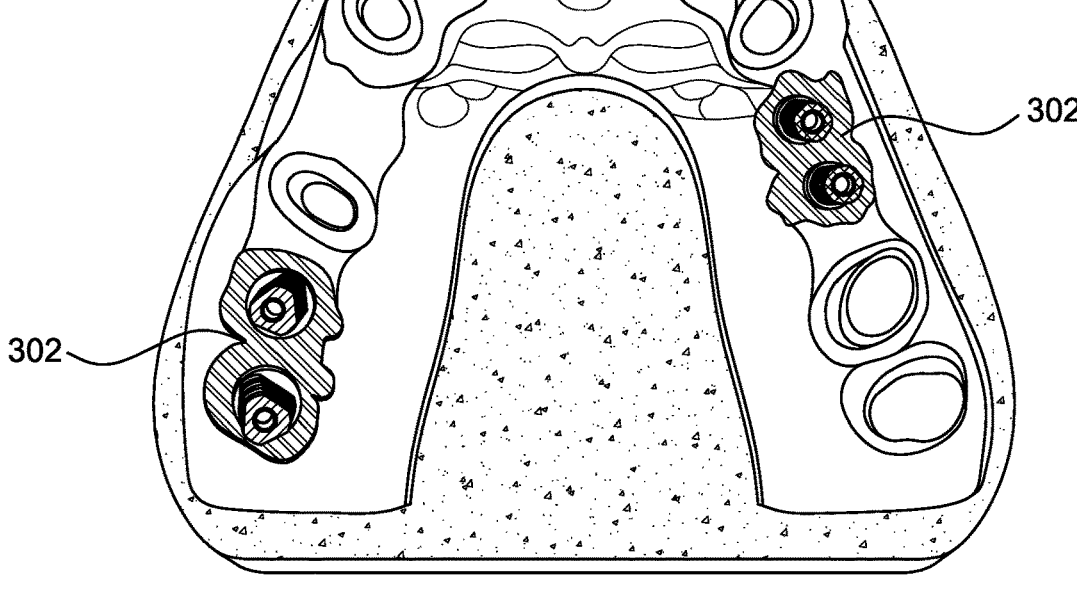
FIG. 3 is an illustration of a dental cast incorporating an impression post, according to certain embodiments.

Subsequently, at step 104, the process 110 includes obtaining a dental impression of the partially-dentate patient in the form of a dental cast 300 including the impression post 302 (four shown for reference in the exemplary illustration of FIG. 3). That is, upon the successful insertion of the impression post 302, the dental impression of the patient's oral anatomy is taken. This dental impression materializes in the form of the dental cast 300 which is, generally, a three-dimensional representation of oral structures of the patient. It may be understood that the impression post 302 is embedded within the dental cast 300, which includes features providing details pertaining to position of the dental implant.

Figure 4:
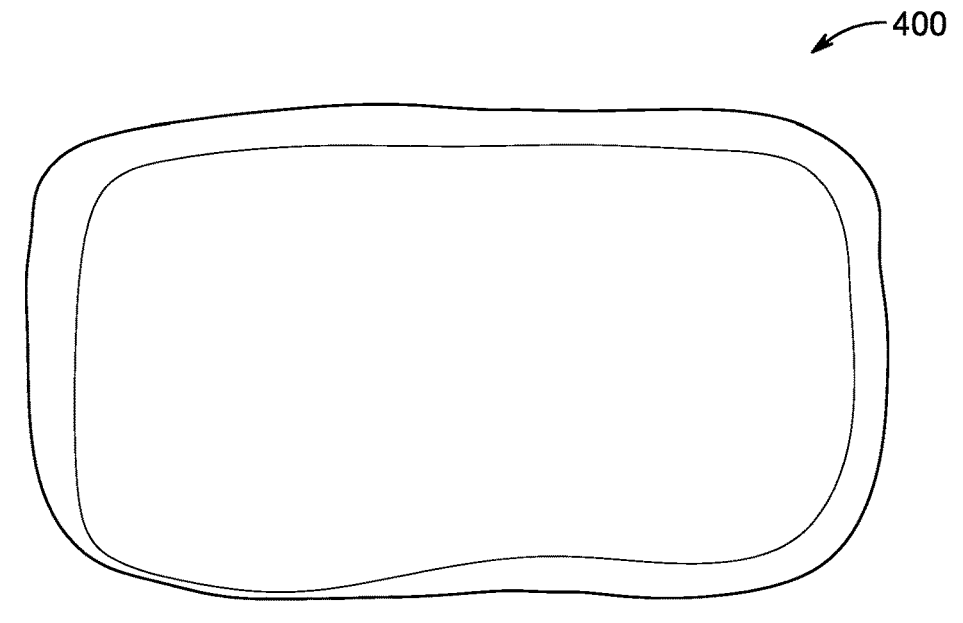
FIG. 4 is an illustration of a light-curable resin molded into a cubic shape, according to certain embodiments.

Then, at step 106, the process 110 includes molding a first light-curable resin into a cubic shape (as illustrated in FIG. 4 and represented by reference numeral 400). That is, following the casting step, the first light-curable resin 400 is introduced which is a material with properties such that, upon exposure to specific wavelengths of light, it undergoes a curing process, transitioning from a malleable state to a solidified, stable form. This choice of material ensures not only durability and strength but also offers flexibility in terms of adjustments and modifications (as may be required, discussed later in more detail). An example of a material of the light curable resin 400 includes a polymer resin matrix (typically containing dimethacrylate monomers, photoinitiators, accelerators and other compounds) and inorganic filler particles (e.g., silica, alkaline glass). Herein, the first light-curable resin 400 is molded into a cubic or box-like configuration. This geometry provides an optimal balance between stability and ease of adjustments in the subsequent stages.

In an embodiment, the impression post 302 includes a cylindrical exterior extension and a plurality of evenly spaced holes passing through the long axis of the extension. Cylindrical designs in dental tools are often favored for their uniformity and ease of insertion. Such a shape ensures that the impression post 302 can be easily inserted into the dental implant, providing a stable base for the subsequent steps of the method 100. Herein, the axis of each hole is perpendicular to the axis of the extension. This perpendicular orientation ensures that the holes do not compromise the structural integrity of the impression post 302, while still allowing for functionalities like ventilation or passage of materials. Further, the axis of each hole is shifted by 10-30 degrees radially from the axis of any neighboring hole. This staggered arrangement provides better structural strength to the impression post 302. A linear alignment could introduce weak points along the impression post 302, but the radial shift ensures a more even distribution of stress. This arrangement may further enhance the accuracy of the dental impression. The staggered holes can capture details of the dental structure, ensuring that the resultant impression is an accurate representation of dental anatomy of the patient.

Figures 5, 6:
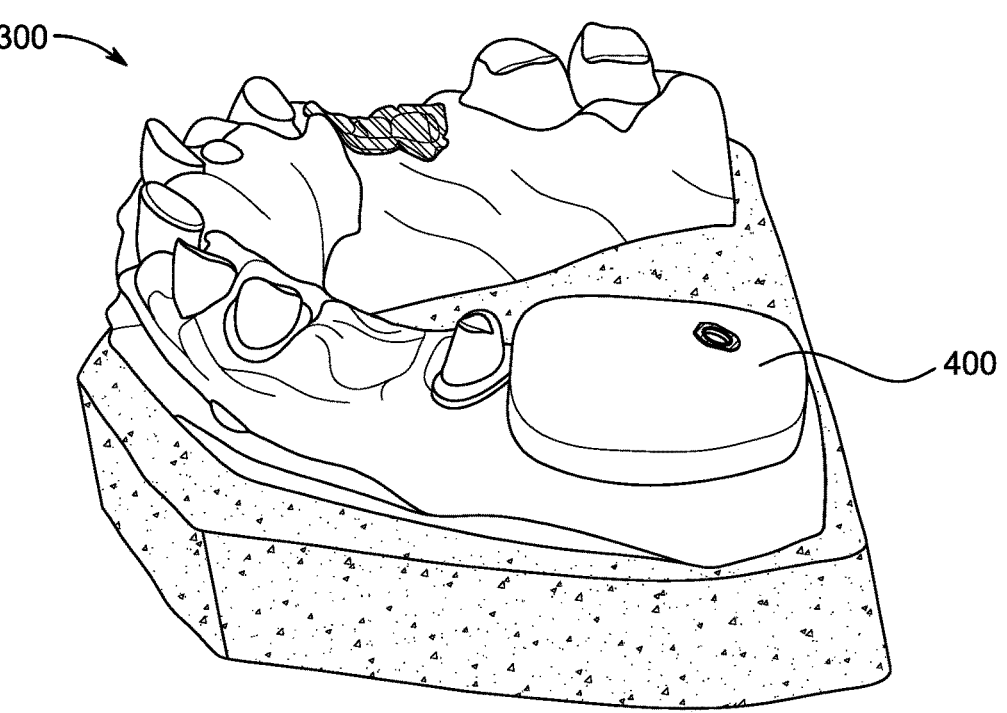
FIG. 5 is an illustration of the light-curable resin attached to the dental cast, according to certain embodiments.
FIG. 6 is an illustration of a curing apparatus implemented for curing of the dental cast with the light-curable resin, according to certain embodiments.

Further, the method 100, at step 120, includes attaching the first light-curable resin 400 to the dental cast 300 of the partially-dentate patient at the impression post 302 used in obtaining the dental impression of the partially-dentate patient for the dental implant. That is, as also depicted in FIG. 5, the first light-curable resin 400 is attached to the dental cast 300 of the patient, specifically at the location of the impression post 302, which was used to obtain the dental impression. The impression post 302 serves as an anchor facilitating this attachment, ensuring the stability and precision for subsequent steps. By using the impression post 302 that has already been utilized during the dental impression-taking process, the method 100 ensures a tailored fit specific to oral anatomy of the patient.

Figure 7:
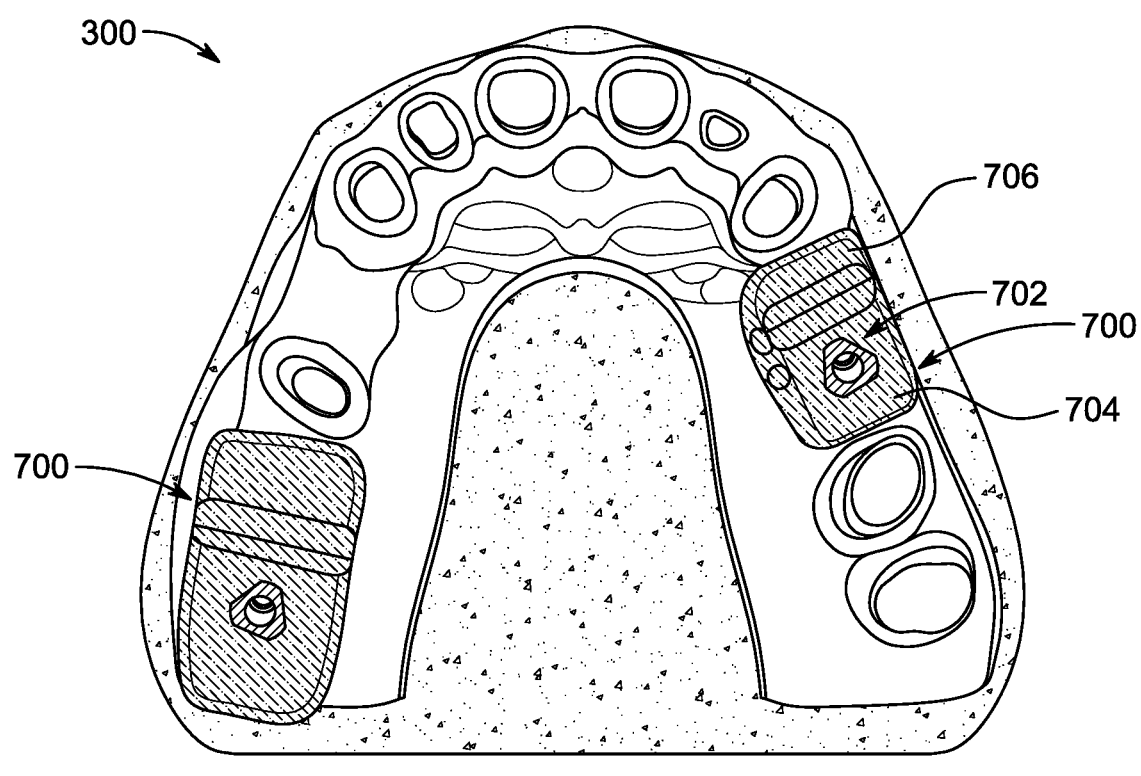
FIG. 7 is an illustration of a record base device with adjustments made thereto, according to certain embodiments.

The method 100, at step 130, includes curing the first light-curable resin 400 on the dental cast 300 using a visible light to form a record base device (as illustrated in FIG. 7 and represented by reference numeral 700). For this purpose, upon ensuring proper alignment, the first light-curable resin 400 is subjected to a visible light source. This exposure initiates the curing process, solidifying the resin and integrating it firmly with the dental cast 300. FIG. 6 illustrates a curing apparatus 600 which may be implemented for curing of the first light-curable resin 400. Herein, the dental cast 300 of the patient (with the first light-curable resin 400 attached) is placed inside the curing apparatus 600. The curing apparatus 600 then subjects the dental cast 300 to the visible light to cure the first light-curable resin 400 therein. The resultant structure is the record base device 700, a stable platform designed to facilitate the accurate capture of the interocclusal relationship.

It may be appreciated that the cubic molding and the attachment of the first light-curable resin 400 to the dental cast 300 are contingent on the position of the impression post 302. This attachment of the first light-curable resin 400, in cubic shape, to the dental cast 300, aligning precisely with the impression post 302, ensures that the first light-curable resin 400, once cured and formed into the record base device 700, mirrors exact spatial configuration of the dental implant. The use of visible light in this process ensures an even and controlled curing, mitigating potential anomalies in the resin structure, and ensuring desired rigidity and form. This curing process ensures that the resultant record base device 700 maintains its form and function throughout its lifespan. That said, it may be appreciated that although the curing process has been described to be based on visible light; in other examples, different light source (e.g., ultraviolet), or even alternative curing methods, may be utilized, that may potentially even reduce the curing time or enhance final properties of the resin, without any limitations.

Figure 8:
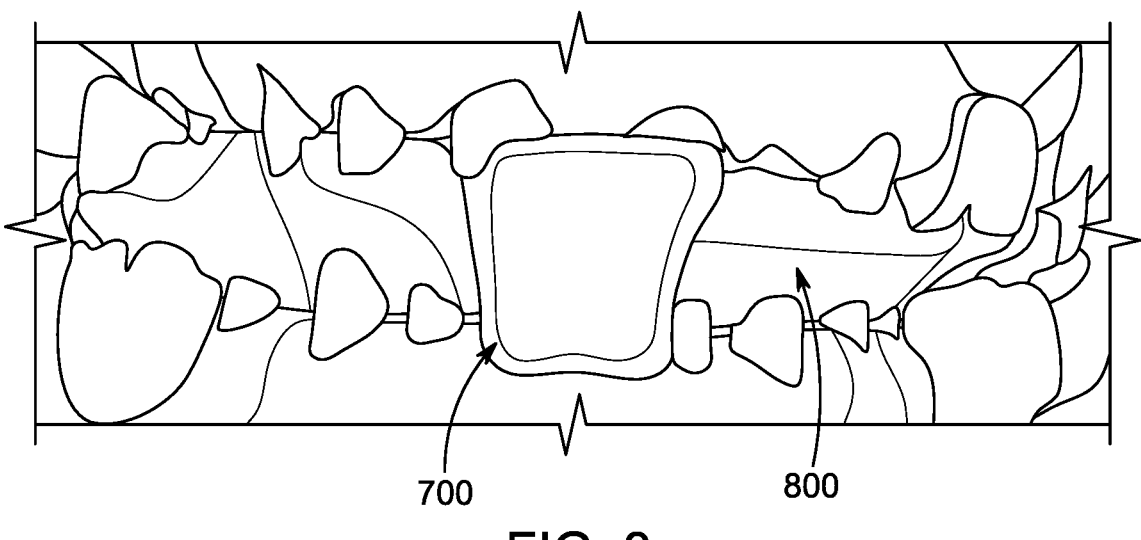
FIG. 8 is an illustration of the record base device provided with interocclusal record material inside mouth to obtain an interocclusal record, according to certain embodiments.

The method 100, at step 140, includes adjusting a shape of the record base device 700 to aid in positioning of an interocclusal record material (as illustrated in FIG. 8 and represented by reference numeral 800). It may be noted that oral anatomies of the patients can vary. Therefore, it may be required to refine the shape of the record base device 700 to better aid in positioning the interocclusal record material 800 that will be used to capture the interocclusal relationship. Such adjustment can be carried out post the light curing procedure using suitable rotary tools. This adjustment may involve modifying the length, breadth, or even height of the record base device 700. This adjustability ensures that the record base device 700 is customized and unique to the patient being served, resulting in a higher degree of accuracy.

In an embodiment, adjusting the shape of the record base device 700 includes forming an upwardly inclining top surface 702 (as depicted in FIG. 7). The top surface 702, inclined in a specific manner, ensures the optimal spread of the interocclusal record material 800, capturing the details of dental arch of the patient and the relationship between the upper and lower teeth. It may be contemplated by a person skilled in the art that the upwardly inclining top surface 702 can better accommodate the dynamic variances in the dental anatomy of patients. As the patient's upper and lower dental arches come into contact, this inclination can facilitate a more natural and comfortable alignment, ensuring that the interocclusal record obtained is as accurate as possible.

In certain embodiments, the upwardly inclining or stepped top surface includes a first flat portion 704 representing a majority of the top surface 702 of the record base device 700 and a second inclined portion 706. That is, the design intricately combines flat and inclined surfaces to cater to various parts of the dental arch, ensuring a comprehensive impression. Herein, generally, the first flat portion 704 forms majority of the top surface 702, ensuring stability during the recording process using the spread of the interocclusal record material 800. This flatness ensures that there is a uniform contact between the record base device 700 and the opposing dental arch. On the other hand, the second inclined portion 706 provides the incline to guide the dental arches into an optimal position for record-taking. This inclination can be especially beneficial to capture the intricacies of the posterior teeth, ensuring that even the farthest molars are accurately represented in the interocclusal record material 800.

It may be noted that it is important to ensure that the record base device 700 is stably affixed within oral cavity of the patient, for providing a stable foundation during the impression-taking process. To achieve this stability, the method 100 involves attaching the record base device 700 to the dental implant of the patient using a fastener (e.g., a screw, not shown). FIG. 8 shows the record base device 700 along with the interocclusal record material 800 positioned inside the oral cavity of the partially-dentate patient covering the dental implant. Fasteners in dental applications are typically designed to provide robust, secure, and often semi-permanent connections. Herein, the use of the fastener ensures that the record base device 700 remains firmly in place, preventing any undesired movement or dislodgement during the process of obtaining an interocclusal record. This firm attachment reduces any movement that can lead to inaccuracies, potentially compromising the fit and comfort of any subsequent prosthesis or dental appliance.

Further, in some embodiments, the method 100 further includes covering the impression post 302 with a coating of a second curable resin (not shown). Herein, the impression post 302 includes the cylindrical exterior extension (as discussed) having a smooth outer surface. As may be appreciated, the cylindrical shape distributes stress evenly making it resistant to bending. Moreover, the smooth outer surface of this cylindrical post minimizes any inconsistencies or aberrations, ensuring that the subsequent coating application is uniform and without voids or overlaps. The second curable resin, as used herein, is distinct from the first light-curable resin 400 used to mold the record base device 700 (a similar process may be used to make the dental cast). The second curable resin has properties of adherence, durability, and optionally elasticity. This action of covering and even application of the second curable resin onto the impression post 302 ensures that every contour and surface of the impression post 302 is uniformly coated. The method 100 further involves shaping the second curable resin on the impression post 302 to form a shaped layer having a thickness no greater than 0.5 times the diameter of the impression post 302. That is, once applied, the second curable resin is shaped to form a layer whose thickness is controlled to not exceed half the diameter of the impression post 302, so that it does not become excessively bulky. Such precision ensures that the impression post 302 retains its original purpose while benefitting from the added attributes of the second curable resin. Herein, the shaped layer includes evenly spaced circular circumferential protrusions. These protrusions can increase the surface area, potentially enhancing the grip or adherence of the impression post 302 within the dental implant. Moreover, the micro-structures provided by the protrusions may aid in capturing more detailed dental impressions, ensuring that the dental structure is accurately represented. The method 100, then, involves curing the shaped layer. That is, the layer of the second curable resin is cured to harden and set. This hardened layer provides that the resultant dental implant-retained record base device 700 is functionally superior and tailored for patient comfort.

Referring to FIG. 2, illustrated is a flowchart listing steps involved in a method (as represented by reference numeral 200) of fabricating a dental implant-retained record base device and obtaining an interocclusal record using the record base device, according to a second embodiment of the present disclosure. In the proceeding paragraphs, the second embodiment of the present disclosure has been described with reference to specific features. It should be understood that the teachings and features described in relation to the first embodiment apply mutatis mutandis to the second embodiment of the present disclosure. For the sake of brevity and to avoid redundancy, the detailed exposition of the second embodiment has been omitted, as it draws substantially from the principles, configurations, and embodiments already elucidated in the context of the first embodiment.

At step 210, the method 200 includes attaching a light-curable resin (such as, the first light-curable resin 400) to a dental cast (such as, the dental cast 300) of a partially-dentate patient using an impression post (such as, the impression post 302) that is used in obtaining a dental impression of the patient for a dental implant. At step 220, the method 200 includes curing the light-curable resin 400 on the dental cast using a visible light to form a record base device (such as, the record base device 700). At step 230, the method 200 includes adjusting a shape of the record base device 700 to aid in positioning of an interocclusal record material (such as, the interocclusal record material 800). At step 240, the method 200 includes obtaining an interocclusal record of the patient using the record base device 700 and the interocclusal record material 800.

In some embodiments of the method 200, obtaining the interocclusal record of the patient includes attaching the record base device 700 to the dental implant of the patient using a fastener. The method 200 further includes positioning the interocclusal record material 800 using the record base device 700 (as depicted in FIG. 8).

In some embodiments of the method 200, attaching the light-curable resin 400 to the dental cast 300 includes molding the light-curable resin 400 into a cubic shape (as depicted in FIG. 4).

In some embodiments of the method 200, adjusting the shape of the record base device 700 includes adjusting a dimension of the record base device 700 (as may be seen from FIG. 7). Herein, the dimension includes at least one of a length, height, or width of the record base device 700.

In some embodiments of the method 200, adjusting the shape of the record base device 700 includes removing a portion of the light-curable resin 400 from a surface (such as, the top surface 702) of the record base device 700 (as depicted in FIG. 7) to aid in the positioning of the interocclusal record material 800.

The present disclosure further provides a dental implant-retained device for obtaining an interocclusal record, according to certain embodiments. It should be noted that the dental implant-retained device, as discussed hereinafter, is congruent with the dental implant-retained record base device as fabricated by the method 100 and the method 200, corresponding to the first embodiment and the second embodiment, respectively. Therefore, any reference, description, or implication pertaining to the dental implant-retained record base device as discussed in the embodiments of the method 100 and the method 200 inherently applies to the dental implant-retained device provided herein, affirming their functional and structural equivalence in the context of the present disclosure.

In the present embodiments, the dental implant-retained device includes a record base device (such as, the record base device 700) that is made of a light-cured resin (such as, the light-curable resin 400). Herein, the light-cured resin 400 is cured by attaching the light-cured resin 400 to a dental cast (such as, the dental cast 300) of a partially-dentate patient using an impression post (such as, the impression post 302) that is used in obtaining a dental impression of the patient for a dental implant. The record base device 700 is configured to attach to the dental implant of the patient for obtaining the interocclusal record of the patient.

In some embodiments of the dental implant-retained device, the light-cured resin 400 is molded to a first shape prior to curing the light-cured resin 400. In some embodiments, the first shape is a cubic shape.

In some embodiments of the dental implant-retained device, the record base device 700 is adjusted to fit in a mouth of the dental patient. In some embodiments, the record base device 700 is adjusted by adjusting a shape, a height, a length, or a width of the record base device 700.

In some embodiments of the dental implant-retained device, the record base device 700 is configured to receive an interocclusal record material (such as, the interocclusal record material 800) for obtaining the interocclusal record. In some embodiments, the record base device 700 is adjusted by removing a portion of the light-cured resin from a surface (such as, the top surface 702) of the record base device 700 to aid in the positioning of the interocclusal record material 800.

The embodiments of the present disclosure offer several advantages over known prior art in the domain of dental prosthetics. By utilizing a light-curable resin 400 and integrating the impression post 302 with the dental implant, the embodiments of the present disclosure ensure a high degree of precision in capturing the interocclusal relationship. This contrasts with traditional methods that often rely on dimensionally unstable materials. The provision provided in the present disclosure for adjusting shape of the record base device 700 post-curing means that it can be tailored to individual patient needs. This ensures a more comfortable fit and accurate impression. The unique design elements, such as the top surface 702 of the record base device 700 provided with inclined portion and the strategically oriented holes in the impression post 302, ensure accurate capture of dental anatomy of the patient. The coating of the impression post 302 with the second curable resin, complete with functional protrusions, ensures better interaction with the impression material. This leads to improved grip, material flow, and overall accuracy in the final impression. By eliminating the need for additional implant parts and specific laboratory materials, the present disclosure introduces cost savings. This not only benefits dental practices but also has the potential to reduce costs for patients.

Obviously, numerous modifications and variations of the present disclosure are possible in light of the above teachings. It is therefore to be understood that within the scope of the appended claims, the present disclosure may be practiced otherwise than as specifically described herein.

The invention claimed is:

1. A method of fabricating a dental implant-retained record base device for obtaining an interocclusal record, the method comprising:
   first inserting an impression post into a dental implant in a partially-dentate patient,
   obtaining a dental impression of the partially-dentate patient in the form of a dental cast including the impression post, then
   molding a first light-curable resin into a cubic shape;
   attaching the first light-curable resin to the dental cast of the partially-dentate patient at the impression post used in obtaining the dental impression of the partially-dentate patient for the dental implant;
   curing the first light-curable resin on the dental cast using a visible light to form a record base device;
   adjusting a shape of the record base device to aid in positioning of an interocclusal record material; and
   attaching the record base device to the dental implant of the patient using a fastener.

2. The method of claim 1, further comprising:
   covering the impression post with a coating of a second curable resin, wherein the impression post includes a cylindrical exterior extension having a smooth outer surface, shaping the second curable resin on the impression post to form a shaped layer having a thickness no greater than 0.5 times the diameter of the impression post, wherein the shaped layer includes evenly spaced circular circumferential protrusions; then curing the shaped layer.

3. The method of claim 1, wherein adjusting the shape of the record base device includes forming an upwardly inclining top surface.

4. The method of claim 3, wherein the upwardly inclining top surface includes a first flat portion representing a majority of the top surface of the record base device and a second inclined portion.

5. A method of fabricating a dental implant-retained record base device for obtaining an interocclusal record, the method comprising:

first inserting an impression post into a dental implant in a partially-dentate patient, obtaining a dental impression of the partially-dentate patient in the form of a dental cast including the impression post, then molding a first light-curable resin into a cubic shape;

attaching the first light-curable resin to the dental cast of the partially-dentate patient at the impression post used in obtaining the dental impression of the partially-dentate patient for the dental implant;

curing the first light-curable resin on the dental cast using a visible light to form a record base device;

wherein the impression post includes a cylindrical exterior extension and a plurality of evenly space holes passing through the long axis of the extension, the axis of each hole perpendicular to the axis of the extension, wherein the axis of each hole is shifted by 10-30 degrees radially from the axis of any neighboring hole.

6. A method of fabricating a dental implant-retained record base device and obtaining an interocclusal record using the dental implant-retained record base device, the method comprising:

attaching a light-curable resin to a dental cast of a partially-dentate patient using an impression post that is used in obtaining a dental impression of the patient for a dental implant;

curing the light-curable resin on the dental cast using a visible light to form a record base device;

adjusting a shape of the record base device to aid in positioning of an interocclusal record material; and obtaining an interocclusal record of the patient using the record base device and the interocclusal record material; and wherein obtaining the interocclusal record of the patient includes:

attaching the record base device to the dental implant of the patient using a fastener; and positioning the interocclusal record material using the record base device.

7. The method of claim 6, wherein attaching the light-curable resin to the dental cast includes molding the light-curable resin into a cubic shape.

8. The method of claim 6, wherein adjusting the shape of the record base device includes adjusting a dimension of the record base device.

9. The method of claim 8, wherein the dimension includes at least one of a length, height, or width of the record base device.

10. The method of claim 6, wherein adjusting the shape of the record base device includes after curing the resin, removing a portion of the resin from a surface of the record base device to aid in the positioning of the interocclusal record material.

* * * * *